3,320,198
LATEX PAINT CONTAINING BENZOPHENONE
Trevor B. Hill, Drexel Hill, Pa., assignor to E. I. du Pont de Nemours and Company, Wilmington, Del., a corporation of Delaware
No Drawing. Filed Jan. 28, 1963, Ser. No. 254,440
7 Claims. (Cl. 260—29.6)

This invention relates to a new acrylic polymer latex paint composition which is especially useful as an exterior house paint. It also relates to a method of forming a dirt-repellent, crack-resistant dried paint film from this novel latex paint, and to the resulting painted article.

The term "acrylic polymer" herein designates a polymer composed predominantly of an alkyl acrylate, an alkyl methacrylate, or a blend thereof.

The term "latex paint" herein designates an aqueous dispersion of water-insoluble organic film-forming material. As is well known in the art, latex paints also usually contain a pigment, a surfactant (emulsifying agent), and a pH controlling agent. Latex paints are sometimes referred to as emulsion paints, water-base paints and water-dilutable paints. The film-forming material is present in the latex in the form of very fine particles. As the paint film dries, these particles coalesce.

The paint industry in recent years has developed a successful line of interior latex wall paints. A typical paint of this type contains a blend of an acrylic polymer and a buna-S polymer as the film-former, the buna-S component being suitable for interior use. The ease of application and clean-up, low odor level, etc., have made these interior paints very popular. The industry has also had a great deal of success with solution type acrylic automobile paints containing a hard weather-resistant acrylic polymer film-former. Many attempts have been made to combine the outdoor durability of the hard acrylic exterior automobile paint with the "pleasant-to-work-with" advantages of the indoor latex paint to provide a suitable latex house paint for exterior use. But the paints developed prior to the present invention have not been entirely satisfactory, especially when applied to exterior articles made of wood.

The relatively great dimensional changes that occur in wood siding and other articles made of wood, when exposed to all kinds of weather, place a definite limitation on the type of polymer which can be used successfully as the film-former in a paint for these articles. For example, unsatisfactory weather resistance is obtained when a significant proportion of the film-former is a buna-S polymer, and although a hard type of acrylic polymer of the type used in exterior automobile paint (e.g., polymethyl methacrylate), gives a dirt repellent and non-tacky surface, it leads to poor adhesion and excessive cracking of the paint film when used as the film-former in an exterior latex paint for wood siding. When an acrylic polymer is used that is soft enough to give good adhesion and resistance to cracking (e.g., an interpolymer containing both hard and soft units), the paint film is too soft and tacky, and it readily acquires a dirty and unsightly appearance because of the amount of air-borne dirt that clings to it. Attempts to solve the problem by using more than the usual amount of chalking or non-chalking pigments along with a soft resin have not been successful.

It is therefore an object of this invention to provide a new and improved acrylic polymer latex exterior house paint.

Another object is to provide such a paint which, when applied to the wood siding on a house and exposed to both hot and cold weather is not only highly crack-resistant but also resistant enough to the collection of dirt on its surface so that the siding retains a clean appearance.

Other objects will be apparent from the description of the invention which follows.

Expressed broadly, the novel latex paint of this invention is an aqueous dispersion of a certain type of water-insoluble acrylic polymer, pigment and about 0.3 to 10% of benzophenone based on the dry weight of the acrylic interpolymer. The volume of pigment in the paint equals about 10 to 50% of the total volume of non-volatile components in the paint (pigment volume concentration).

The water-insoluble acrylic polymer component of the paint is composed of the following monomer units in polymerized form:

(A) an alpha, beta-unsaturated mono-olefinic carboxylic acid, or a water-soluble salt thereof, (B) an acrylic ester which by itself is polymerizable to a soft polymer (soft-unit monomer), including one or more of the following: (1) an ester of acrylic acid and a primary alkanol of 1 to 18 carbon atoms, (2) an ester of acrylic acid and a secondary alkanol of 1 to 18 carbon atoms, (3) an ester of methacrylic acid and a primary alkanol of 5 to 18 carbon atoms, or (4) an ester of methacrylic acid and a secondary alkanol of 5 to 18 carbon atoms, and (C) a monovinylidene compound which by itself is polymerizable to a hard polymer (hard-unit monomer) including (1) an alkyl methacrylate in which the alkyl group has 1 to 4 carbon atoms, (2) tert-amyl methacrylate, (3) tert-butyl acrylate, (4) tert-amyl acrylate, (5) cyclohexyl acrylate, (6) cyclohexyl methacrylate, or a blend of 2 or more such compounds.

Any of the 3 essential monomer components can be composed of a blend of a plurality of different monomers within the type described.

Monomer component A of the interpolymer is present in an amount equal to about 0.3 to 4% of the combined weight of components A, B and C. The weight ratio of components B and C (B:C) is about 90:10 to 10:90. In view of the present disclosure, a skilled paint chemist will be able to select a B:C ratio to give the best balance of cold weather crack resistance and freedom from undue tackiness in hot weather for the particular paint formulation and anticipated use and exposure conditions.

The acrylic interpolymer defined above can be prepared by the method described in U.S. Patent 2,795,564, the disclosure of which is incorporated herein by reference. Thus, it can be prepared by (1) dispersing monomer components A, B and C in the proportions specified above in an aqueous medium having a water-soluble non-ionic surfactant content of about 1 to 7% by weight, (2) mixing with the resulting monomer emulsion a peroxidic polymerization catalyst which is soluble in the emulsion and a soluble sulfite reducing agent to form a redox system, (3) interpolymerizing the monomers at about 15 to 80° C. until a water-insoluble interpolymer is formed in aqueous dispersion, (4) adjusting the pH of the dispersion to a value of about 9.0 to 9.8 with an alkaline material such as ammonia, a water-soluble amine, or an alkali metal base.

Monomers A, B and C, as well as acrylic interpolymers of the type defined above, are described in greater detail in U.S. 2,795,564.

In a preferred type of acrylic interpolymer for the practice of this invention, component C is methyl methacrylate, component B is an ester of acrylic acid and a saturated aliphatic monohydric primary alcohol of 4 to 8 carbon atoms, and the B:C weight ratio is about 80:20 to 50:50. When using a predominant proportion of a $C_4$ alcohol, it is preferable that the B:C ratio be about 80:20 to 60:40, whereas a ratio of about 70:30 to 55:45 is preferred when the alcohol is predominantly a $C_8$ alcohol. Mixtures of any of the $C_4$ to $C_8$ alcohols can, of course, be used.

This preferred type of interpolymer is preferably prepared by the method described above except (a) the aqueous medium in the first step contains about 0.3 to 5% of a water-soluble anionic surfactant based on the combined weight of monomers, A, B and C, and (b) the pH of the interpolymer dispersion is adjusted in the fourth step to a value of about 7.5 to 10.0, preferably with ammonia. A nonionic surfactant can also be added to the dispersion.

The pigment component of this novel paint can include one or more of the pigments and pigment extenders known to be useful in latex paints. Useful prime pigments are exemplified by titanium dioxide, zinc oxide, zinc sulfide, lead titanate, antimony oxide, zirconium oxide, white lead, basic lead silicate, lithopone, carbon black, iron oxides of various colors, lead chromate, molybdate, orange, and phthalocyanine blue. Useful pigment extenders are exemplified by calcium carbonate, talc, barytes, magnesium and aluminum silicates, diatomaceous earth, asbestine, china clay, silica and fine mica.

The paint should normally have a pigment volume concentration of about 10 to 50%, preferably about 25 to 40%, in order to have a satisfactory balance of exterior paint properties, such as hiding power and weather resistance. Slightly less than 10% can be used when hiding power is not important, for example, in a primer coat. And slightly over 50% can be used when weather resistance requirements are at a minimum, for example, in a topcoat for an area partially sheltered from the weather by a porch, breezeway or the like.

In a preferred method of preparing the paint, the pigment is premixed with water containing a soluble surfactant, and this pigment premix or paste is then blended with the aqueous interpolymer dispersion (polymer latex). A small portion of the polymer latex and various known paint additives can be added to the pigment premix in accordance with known methods of preparing latex paints.

The novel latex paint contains about 0.3 to 10%, preferably about 0.5 to 3%, of benzophenone based on the dry weight of acrylic interpolymer present. This requirement is at the heart of the present invention. At least about 0.3% is needed to provide a noticeable improvement in the cleanliness retention or dirt repellent capacity of the dried paint film. More than about 6% tends to cause yellowing of white paint films and in general does not provide enough further enhancement of cleanliness characteristics to justify the added expense.

The benzophenone can be incorporated into the novel paint by first dissolving it in toluene or another organic solvent in which it is soluble, and mixing the resulting solution either with the pigment premix, the polymer latex, or the completed pigment/polymer mixture.

The more useful formulations of this paint have a total non-volatile content of about 20 to 65% by weight, 35 to 50% being ordinarily preferred for brush application to a wood substrate. A bodying agent can be added as needed to provide the desired viscosity, which is preferably about 65 to 85 Krebs units for brush painting.

The novel paint can contain one or more of the many additives or modifiers known to be useful in latex paints, for example, sequestering agents, plasticizers, dispersing agents, defoaming agent, humectants, thickeners, antifreeze agents, bactericides, odor controlling agents, and various particulate water-insoluble organic film-forming materials other than the interpolymer described above. It is preferred, however, that the acrylic interpolymer be the predominant film-forming material.

The paint of this invention can be applied to the siding of houses and to various other weather-exposed articles by such known coating methods as brushing, spraying, roller coating and dipping.

The substrate to which the novel paint can be applied include bare wood, wood that has previously been painted with a solution or emulsion type of paint, aluminum and other metals, cement-asbestos composition, brick, stucco and cement. Conventional primers can be applied to these materials first; for example, bare wood can first be primed with an ordinary oil or alkyd resin solution type of exterior wood primer, and thoroughly dried before the novel latex paint is applied.

The dried paint film deposited from the novel latex paint, after being exposed outdoors in the sunlight (the radiation of which has a wave length predominantly above 300 millimicrons) for about 2 to 4 weeks, has a noticeably improved tendency to retain a clean appearance on exposure to the weather compared with a paint film of the same composition except for the absence of benzophenone. This desirable cleanliness (dirt repellent) characteristic is obtained at a slightly slower rate on a shady side of a buliding than on a side exposed to the direct rays of the sun. In order to prevent undue delay in obtaining improved cleanliness retention, it is advisable to do the outdoor painting a month or so in advance of a prolonged cold season having an average temperature of less than about 10 to 15° C.

A sun lamp or other artificial source of actinic light can be used in place of natural sunlight, for example, on small or portable articles; but of course this is neither convenient nor economical for the average housepainting project. To illustrate, an exposure of about 50 to 300 hours is usually sufficient with a Westinghouse FS–40–T12 type of fluorescent sun lamp at a distance of 5 inches from the paint film. The radiation of this lamp is predominantly of 275 to 350 millimicrons, and has maximum energy at 305 to 318 millimicrons.

It is not yet fully understood how the unique combination of cleanliness retention and crack resistance is obtained in the paint film of this invention, and it is not intended herein to be limited to any particular theory. It is believed, however, that exposure of the benzophenone-containing paint film to sunlight or an equivalent source of actinic light causes the piant film to become layered with respect to hardness. Thus, the exposed surface becomes relatively hard while the remainder of the film retains the degree of flexibility and tackiness needed for satisfactory crack resistance and adhesion.

It is expected that the most advantageous utility of this novel paint will be as a topcoat on wood articles exposed the entire year to the type of weather that prevails in the northern half of the United States and Europe, where the article is subjected to alternate wet and dry cycles of both low and high temperatures, e.g., from about −25° to +38° C. The dirt repellant advantage is obtainable in accordance with this invention in any type of climate and in atmospheres varying from rural (relatively clean) to heavy industrial (relatively dirty).

As previously indicated, the paint is useful for coating articles made from a wide variety of materials, the articles being usable for extended periods either outdoors or indoors.

The invention permits the use of a more adherent and flexible film-forming material than was previously possible in an exterior acrylic latex paint with satisfactory dirt repellent properties. Thus, improved adhesion, and crack resistance is obtainable in the dried paint film along with improved retention of a clean appearance. Improved mildew resistance for housepaints is also obtainable.

The examples which follow are given for the purpose of illustrating the invention. All quantities shown are on a weight basis unless otherwise indicated. The water listed in the formulas is deionized water.

EXAMPLE 1

A white acrylic latex paint adapted for use on the exterior siding and trim of houses having clapboard or other types of wood siding is prepared by first following Formula A to make an aqueous dispersion (latex) of a preferred type of acrylic interpolymer.

Formula A.—Interpolymer Latex

| Portion 1 | Parts by weight |
|---|---|
| Water | 455.0 |
| Portion 2 | |
| Water | 380.0 |
| Methyl methacrylate | 308.0 |
| 2-ethylhexyl acrylate | 454.0 |
| Methacrylic acid | 8.0 |
| Anionic surfactant, 30% aqueous solution of sodium lauryl sulfate | 25.6 |
| Sodium meta-bisulfite | 0.81 |
| Portion 3 | |
| Potassium persulfate, 10% aqueous solution | 16.94 |
| Portion 4 | |
| Same as Portion 3 | 4.18 |
| Portion 5 | |
| Ammonium hydroxide, 14% NH$_3$ | 16.0 |
| Portion 6 | |
| Nonionic surfactant, 50% aqueous solution of "Triton" X-100 (octyl phenyl polyglycol ether) | 92.4 |
| Portion 7 | |
| Benzophenone, 50% solution in toluene | 7.8 |
| | 1768.73 |

Portion 1 is charged into a conventional polymerization reaction vessel equipped with stirrer, means to control temperature, and means to introduce nitrogen. The polymerization reaction to follow is carried out under nitrogen. Portion 2 is premixed to emulsify the acrylic monomers; 120 parts of this portion are added to the vessel with stirring and the resulting mixture is heated to 65° C. Portion 3 is then added with stirring, the temperature is raised to 74° C., a reaction mixture temperature of 74 to 78° C. is maintained for 5 minutes, and while continuing to maintain this temperature, the remainder of Portion 2 is added gradually over a period of 140 minutes. Portion 4 is added and the mixture kept at 74 to 78° C. for 90 minutes more. After cooling the resulting interpolymer latex to 25° C., Portions 5, 6 and 7 are added successively with thorough stirring, stirring is continued for 15 minutes, then the latex is filtered through cheesecloth to remove any coarse coagulum that has formed.

The resulting latex has a pH of about 9.5 and a polymer content of about 47%, the polymer being a 40:59:1 interpolymer of methyl methacrylate:2-ethylhexyl acrylate:methacrylic acid. The average diameter of the polymer particles is about 0.1 to 0.2 micron. The polymer has a relative viscosity of about 1.20, a tensile strength of over 1000 p.s.i. at 0° F. and an elongation of over 180% at 0° F. The latex contains about 0.5% of benzophenone based on the dry weight of the acrylic polymer present.

Pigment and various modifiers are added to the Formula A latex in the form of ap remixed dispersion prepared according to Formula B.

Formula B.—Pigment dispersion

| Portion 1 | Parts by weight |
|---|---|
| Talc pigment extender | 10.93 |
| Methyl cellulose, "Methocel" HG | 0.27 |
| Portion 2 | |
| Water | 12.21 |
| Portion 3 | |
| Anti-foam agent, "Nopco" 1497V | 0.30 |
| Potassium tripolyphosphate | 0.17 |
| Ammonium hydroxide, 28% NH$_3$ | 0.23 |
| Bodying Agent, "Acrysol" A-3 | 0.51 |
| Phenyl Mercury oleate, 10% in mineral spirits | 3.24 |
| Ethylene glycol | 2.59 |
| Portion 4 | |
| Titanium dioxide pigment | 35.68 |
| Portion 5 | |
| Nonionic surfactant, "Tween" 40 | 0.10 |
| Portion 5 | |
| Water | 6.03 |
| Mica pigment extender | 10.93 |
| Portion 6 | |
| Ammonium hydroxide, 28% NH$_3$ | 0.17 |
| Anti-foam agent, "Nopco" 1497V | 0.13 |
| Formula A latex | 8.50 |
| Portion 7 | |
| Formula A latex | 8.01 |
| | 100.00 |

In Formula B: "Methocel" HG has a viscosity of 3000 to 5000 centipoise at 20° C., measured on a 2% aqueous solution. "Nopco" 1497V is understood to be composed of 60% anionic sulfated saturated fatty acid, 8% free fatty acid, and 32% inert matter. "Acrysol" A-3 is a 25% aqueous solution of low molecular weight water-soluble polyacrylic acid. The titanium dioxide is an 82:18 blend of rutile and anatase types.

The 7 portions of Formula B are introduced into a mixing tank in the order shown and uniformly blended and dispersed in accordance with conventional procedure for making pigment dispersions for use in latex paints.

Next, a paint composition is prepared by uniformly blending the components shown in Formula C.

Formula C.—Acrylic latex house paint

| | Parts by weight |
|---|---|
| Formula A latex | 459.0 |
| Formula B pigment dispersion | 656.7 |
| Bodying Agent, "Acrysol" ASE-60 | 5.3 |
| | 1121.0 |

"Acrysol" ASE-60 is a 28% aqueous solution of a water-soluble interpolymer of methyl methacrylate, ethyl acrylate, and acrylic acid, the latter making up about 35% of the polymer.

The resulting paint has a pigment volume concentration of about 30%, a pH of about 9, a density of about 11.2 pounds per gallon and a convenient brushing viscosity of about 74 Krebs units.

A house in Philadelphia having clapboard siding on all exterior walls is painted during the month of October on the exterior surface with one coat of the Formula C latex paint, using an ordinary paint brush. The house had been painted five years previously with a conventional exterior oil-base primer and white topcoat. The old weathered paint film is scraped lightly to remove loose paint from cracked and blistered areas, and bare areas are primed with a conventional oil-base exterior primer and allowed to dry prior to the latex paint application. The pain film is allowed to air dry and age under ordinary atmospheric conditions. The actinic rays in ordinary daylight bring about a gradual hardening of the exposed surface of the paint film over a period of several weeks, apparently due to the presence of benzophenone in the paint.

The paint film on the house is examined at monthly intervals for a year. All during this period the paint film on all sides of the house retains a clean white apperance and it remains substantially free of cracks and blisters.

EXAMPLE 1A

For purposes of comparison, a house of the same type described in Example 1, in the same section of the city, and with the same type of old paint film, is painted in the same manner as in Example 1 with a paint having the same composition as Formula C, except the benzophenone is omitted from the Formula A latex. Six months after the house is painted, inspection reveals that the paint film on all sides of the house has noticably more dirt clinging to it than the Example 1 paint film has, and the house has a distinctly dirty and unsightly appearance.

EXAMPLE 2

A latex house paint having properties and utility similar to the paint produced in Example 1 is prepared in a manner substantially like that described in Example 1, except the formulas are as follows:

*Formula D.—Interpolymer latex*

| Portion 1 | Parts by weight |
|---|---|
| Water | 141.0 |
| Portion 2 | |
| Water | 270.0 |
| Methyl methacrylate | 125.0 |
| 2-ethylhexyl acrylate | 262.0 |
| Methacrylic acid | 16.1 |
| Anionic surfactant, same is in Formula A | 6.71 |
| Sodium meta-bisulfite | 0.42 |
| Portion 3 | |
| Potassium persulfate, 10% aqueous solution | 8.8 |
| Portion 4 | |
| Same as Portion 3 | 2.31 |
| Portion 5 | |
| Ammonium hydroxide, 14% $NH_3$ | 31.0 |
| Portion 6 | |
| Benzophenone, 50% solution in toluene | 4.38 |
| | 867.72 |

It will be noted that considerably less surfactant is used in Formula D than in Formula A. The polymer obtained here is a 31:65:4 interpolymer of methyl methacrylate:2-ethylhexyl acrylate:methacrylic acid. The latex contains about 0.5% of benzophenone based on the polymer solids.

*Formula E.—Pigment dispersion*

| Portion 1 | Parts by weight |
|---|---|
| Water | 88.9 |
| Magnesium silicate pigment extender | 81.2 |
| Portion 2 | |
| Formula D latex | 244.6 |
| Portion 3 | |
| Titanium dioxide pigment, rutile | 218.1 |
| Titanium dioxide pigment, anatase | 46.5 |
| Portion 4 | |
| Water | 10.0 |
| Formula D latex | 202.0 |
| Mica pigment extender | 81.2 |
| Portion 5 | |
| Water | 27.5 |
| | 1000.0 |

The paint is manufactured by uniformly blending the components shown in Formula F.

*Formula F.—Acrylic latex house paint*

| Portion 1 | Parts by weight |
|---|---|
| Formula D latex | 805 |
| Formula E pigment dispersion | 1000 |
| Portion 2 | |
| Bodying Agent and fungicide | 55 |
| Portion 3 | |
| Water | 65 |
| | 1925 |

Portion 2 is composed of 62.1% water, 15.5% of the bodying agent shown in Formula C, 21.1% of a 22% aqueous solution of di(phenyl mercury)dodecenyl succinate, and 1.3% of ammonium hydroxide (28% $NH_3$).

EXAMPLE 3

A latex house paint having properties and utility similar to the paint produced in Example 1 (except for somewhat lower crack resistance) is prepared by repeating Example 1, except for the following differences:

The Formula A latex is replaced with a polymer latex prepared in accordance with U.S. Patent 2,795,564, Example 3. The polymer solids content of the latex is adjusted to 46%. The polymer is a 37:61.5:1.5 interpolymer of methyl methacrylate:ethyl acrylate:methacrylic acid, a somewhat harder polymer than used in Example 1. Benzophenone is added to the latex in the manner and the proportion (0.5% based on polymer) described in Example 1.

The Example 3 paint is produced by uniformly blending the components shown in Formula G.

*Formula G.—Acrylic latex house paint*

| | Parts by weight |
|---|---|
| Example 3 latex | 1000 |
| Formula B pigment dispersion | 735 |
| Water | 29 |
| | 1764 |

Similar results are obtained by replacing the polymer in Example 3 with a 33:65.5:1.5 interpolymer of methyl methacrylate:ethyl acrylate:methacrylic acid, a usable latex of which is available from Rohm & Haas Company under the name "Rhoplex" AC-33.

When individual unmounted pieces of clapboard siding are finished and exposed in the manner described in the above examples, the same advantageous results are obtained with respect to retention of a clean appearance.

I claim:
1. As a novel latex paint, an aqueous dispersion of a water-insoluble acrylic interpolymer, pigment, and about 0.3 to 10% of benzophenone based on the dry weight of said interpolymer, the paint having a pigment volume concentration of about 10 to 50%, and said interpolymer being composed of polymerized units of the monomers
   (A) an alpha, beta-unsaturated mono-olefinic carboxylic acid,
   (B) a soft-unit monomer selected from the group consisting of (1) esters of acrylic acid and a primary alkanol of 1 to 18 carbon atoms, (2) esters of acrylic acid and a secondary alcohol of 1 to 18 carbon atoms, (3) esters of methacrylic acid and a primary alkanol of 5 to 18 carbon atoms, and (4) esters of methacrylic acid and a secondary alkanol of 5 to 18 carbon atoms, and
   (C) a hard-unit monomer selected from the group consisting of (1) alkyl methacrylates in which the alkyl group has 1 to 4 carbon atoms, (2) tert-amyl methacrylate, (3) tert-butyl acrylate, (4) tert-amyl acrylate, (5) cyclohexyl acrylate, and (6) cyclohexylate,
      the weight of A being about 0.3 to 4% of the combined weight of A, B and C, and B:C weight ratio being about from 90:10 to 10:90.
2. A latex paint as defined in claim 1 wherein monomer B is an etser of acrylic acid and a saturated monohydric primary alcohol of 4 to 8 carbon atoms, monomer C is methyl methacrylate, and the B:C weight ratio is about from 80:20 to 50:50.
3. A latex paint as defined in claim 2 wherein monomer B is 2-ethylhexyl acrylate.
4. A latex paint as defined in claim 3 wherein the benzophenone content is about 0.5 to 3% by weight of polymer solids, the pigment volume concentration is about 25 to 40%, the combined weight of polymer and pigment equals about 20 to 65% of the weight of the paint, and the paint has a viscosity of about 65 to 85 Krebs units.
5. A method of making a dirt-repellent painted article which comprises (a) painting an article of solid construction material with a coat of the latex paint defined in claim 1, (b) drying the coat of paint, and (c) exposing the dried paint film to sunlight for at least two weeks.

6. A method as defined in claim 5 wherein said construction material is wood.

7. An article made by the method of claim 5.

References Cited by the Examiner

UNITED STATES PATENTS

| | | | |
|---|---|---|---|
| 2,484,529 | 10/1949 | Roedel | 204—158 |
| 2,754,280 | 7/1956 | Brown et al. | 260—29.6 |
| 2,760,886 | 8/1956 | Prentiss et al. | 260—29.6 |
| 3,011,988 | 12/1961 | Luedke et al. | 117—148 |
| 3,014,799 | 12/1961 | Oster | 204—154 |

OTHER REFERENCES

Charlesby, Radiation Effects on Materials, 1960, Pergamon Press Ltd., Great Britain, p. 104.

Martin, Use of Radiation to Promote Chemical Reactions, vol. 33, No. 14, Apr. 4, 1955, pp. 1424–1428.

SAMUEL H. BLECH, *Primary Examiner.*

MURRAY TILLMAN, *Examiner.*

N. F. OBLON, W. J. BRIGGS, *Assistant Examiners.*